US011704696B2

(12) United States Patent
Strutton et al.

(10) Patent No.: US 11,704,696 B2
(45) Date of Patent: Jul. 18, 2023

(54) GENERATING TRACKING URLS AND REDIRECTING FROM TRACKING URLS

(71) Applicant: Oracle International Corporation, Redwood Shores, CA (US)

(72) Inventors: Michael J. Strutton, Villa Rica, GA (US); Steven Keith Woods, Etobicoke (CA); Chad Estes, Atlanta, GA (US); Kimberly Ann Wolfe, Decatur, GA (US); Donald Chun Wing Ho, Thornhill (CA); Yizhou Jiang, Belmont, CA (US); Natalie You, Mountain View, CA (US); Wenhua Li, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 530 days.

(21) Appl. No.: 16/584,728

(22) Filed: Sep. 26, 2019

(65) Prior Publication Data

US 2020/0027128 A1 Jan. 23, 2020

Related U.S. Application Data

(63) Continuation-in-part of application No. 14/491,573, filed on Sep. 19, 2014, now abandoned.
(Continued)

(51) Int. Cl.
*G06Q 30/0251* (2023.01)
(52) U.S. Cl.
CPC ..... *G06Q 30/0261* (2013.01); *G06Q 30/0267* (2013.01)
(58) Field of Classification Search
None
See application file for complete search history.

(56) References Cited

U.S. PATENT DOCUMENTS 8,307,101 B1 * 11/2012 Mui .................... G06Q 10/063
707/812
8,352,318 B2 1/2013 Rikhtverchik et al.
(Continued)

FOREIGN PATENT DOCUMENTS

CN 103562946 A * 2/2014 ......... G06Q 30/0255

OTHER PUBLICATIONS

McGaw, Dan, "How to Create UTM Parameters for Tracking Paid Marketing Campaigns", utm.io, Sep. 28, 2018, https://web.utm.io/blog/how-to-use-utms-to-track-paid-marketing-campaigns/ (Year: 2018).*
(Continued)

*Primary Examiner* — Kambiz Abdi
*Assistant Examiner* — Scott Snider
(74) *Attorney, Agent, or Firm* — Invoke

(57) ABSTRACT

A single tracking URL collects tracking information for multiple tracking services based on multiple tracking URL templates. A dynamic link generator generates a tracking URL configured to collect tracking information requested by each of a set of enabled tracking URL templates. The tracking information is transmitted to the tracking services associated with the enabled tracking URL templates. Additionally or alternatively, a tracking URL is configured to redirect a consumer to one of a candidate set of destination URLs. A tracking URL includes a base URL, which is resolved to an IP address of a server of a particular tracking service. Based on tracking data associated with the tracking URL and/or digital body language associated with the consumer, the particular tracking service selects one of a candidate set of destination URLs associated with the tracking URL. A destination page corresponding to the selected destination URL is presented to the consumer.

20 Claims, 10 Drawing Sheets

Related U.S. Application Data

(60) Provisional application No. 61/880,024, filed on Sep. 19, 2013.

(56) References Cited

U.S. PATENT DOCUMENTS

| | | | |
|---|---|---|---|
| 8,738,734 B2 * | 5/2014 | Cobb | G06Q 30/0277 |
| | | | 709/227 |
| 8,788,334 B2 | 7/2014 | Rose et al. | |
| 9,210,229 B2 | 12/2015 | McIntosh et al. | |
| 9,497,278 B2 | 11/2016 | McIntosh et al. | |
| 9,633,399 B2 | 4/2017 | George et al. | |
| 9,742,661 B2 | 8/2017 | Klais | |
| 2005/0160002 A1 | 7/2005 | Roetter et al. | |
| 2006/0212350 A1 | 9/2006 | Ellis et al. | |
| 2007/0168506 A1 * | 7/2007 | Douglas | H04L 67/02 |
| | | | 709/224 |
| 2007/0282785 A1 * | 12/2007 | Fayyad | G06Q 30/0244 |
| 2010/0023392 A1 | 1/2010 | Merriman et al. | |
| 2010/0180013 A1 | 7/2010 | Shkedi | |
| 2011/0313996 A1 | 12/2011 | Strauss et al. | |
| 2012/0190386 A1 | 7/2012 | Anderson | |
| 2013/0117108 A1 | 5/2013 | Spears et al. | |
| 2013/0159298 A1 | 6/2013 | Mason et al. | |
| 2013/0179534 A1 | 7/2013 | Sanghavi et al. | |
| 2014/0058831 A1 * | 2/2014 | Duva | H04M 3/51 |
| | | | 705/14.45 |
| 2014/0129733 A1 | 5/2014 | Klais | |
| 2014/0136451 A1 | 5/2014 | Marti et al. | |
| 2014/0143337 A1 | 5/2014 | McIntosh et al. | |
| 2014/0180788 A1 | 6/2014 | George et al. | |
| 2015/0006295 A1 | 1/2015 | Liu et al. | |
| 2015/0081419 A1 | 3/2015 | Strutton et al. | |
| 2015/0206177 A1 * | 7/2015 | Yao | G06Q 30/0246 |
| | | | 705/14.45 |
| 2015/0347924 A1 | 12/2015 | Zeng et al. | |
| 2016/0155142 A1 * | 6/2016 | Dubey | G06Q 50/01 |
| | | | 705/14.41 |

OTHER PUBLICATIONS

Chen, H etal. Business Intelligence and Analytics: From Big Data to Big Impact. MIS Quarterly, vol. 36, No. 4, Dec. 2012, pp. 1165-1188 [online], [retrieved on Mar. 26, 2021], Retrieved from the Internet: <URL:http://citeseerx.ist.psu.edu/viewdoc/download?doi=10.1.1.717.5529&rep=rep1 &type=pdf > (Year: 2012).

* cited by examiner

GENERATING TRACKING URLS AND REDIRECTING FROM TRACKING URLS

INCORPORATION BY REFERENCE

The following applications are hereby incorporated in their entirety: U.S. Non-Provisional application Ser. No. 14/491,573, filed Sep. 19, 2014; U.S. Provisional Application No. 61/880,024, filed Sep. 19, 2013; U.S. Non-Provisional application Ser. No. 14/491,387, filed Sep. 19, 2014.

The Applicant hereby rescinds any disclaimer of claim scope in the parent application(s) or the prosecution history thereof and advises the USPTO that the claims in this application may be broader than any claim in the parent application(s).

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present application relates to software development and more specifically to systems and methods for implementing enterprise software applications.

The popularity of social media websites and portals, such as Facebook, Twitter, and others in recent years has provided marketers and advertisers with new avenues and opportunities for marketing their products and services. Social media sites provide a platform for individual consumers and marketers to communicate and interact, e.g., through Facebook pages or Twitter handles. Marketers can post messages or advertisements on these social media systems as a way to advertise outside traditional marketing channels. Consumers, in turn, can respond by clicking on embedded links, replying to the messages, share posts based on the messages, or performing other site-specific functions. Further, marketers can embed an organization-specific or marketing campaign-specific URLs (Webpage address) within the messages, driving users and Web traffic to a separate Web site.

The increased interactions between marketers and consumers over social media platforms may present many new opportunities for marketers. If marketers are able to track the behavior of consumer interactions with social media posts and URLs, it may allow for additional personalization of marketing and promotion. Consumer online behavior and interactions with digital marketing properties may be collectively referred to as a consumer's "digital body language." For example, if a consumer is known by the marketer to have clicked on URLs corresponding to a particular marketing campaign a certain number of times, it may be desirable to be able to send them an email or special offer relating to the campaign. It may also be desirable to redirect consumers that have clicked on a URL to a different page, if they have demonstrated interest in a particular campaign, compared to consumers that clicked the URL who are being exposed to the campaign for the first time.

Current tracking URLs can be used by a tracking service to determine an amount of traffic or number of clicks to a land page coming from various sources. However, while tracking URLs may be useful for gathering aggregate data, they typically are not able to analyze the behavior of individual users. Tracking URLs are also passive, able to store aggregate information, but not actively influence how the consumer is to be marketed to. On the other hand, while typical methods for tracking user activity may be used to form a history or log of pages that a user has visited, they typically cannot determine how the user reaches those pages.

Therefore, there is a need for an improved approach for tracking consumer digital body language.

GENERAL OVERVIEW

The present application presents an improved approach for tracking consumer digital body language. In some embodiments, a campaign originally created in marketing automation application (e.g., the Eloqua product, available from Oracle Corporation of Redwood Shores, Calif.) is assigned to social posts by specifying one or more campaign tags within an SRM (social relationship management) platform. The campaign may be associated with a tracking URL template for dynamically creating tracking URLs. Posts associated with a campaign may be created by entering post details and parameters and automatically retrieving the campaign tags. The parameters and template may be combined with a base URL specifying the tracking service to be used to form a tracking URL to be published with the post.

When a consumer clicks on a URL associated with a published post, the tracking URL is read and parsed by tracking and analytics services. Tracking information may be read by a tracking service and stored for analysis. In addition, digital body language may be stored for the consumer. In some embodiments, storing digital body language may comprise determining whether a consumer system contains a tracking cookie, and identifying a consumer profile containing past consumer behavior if a cookie is found. The consumer will then be redirected to the destination URL.

One or more embodiments include using a single tracking URL to collect tracking information for multiple tracking services based on multiple tracking URL templates. Different tracking URL templates are associated with different tracking services. A tracking URL template indicates what tracking information is collected and/or required by the associated tracking service. A tracking URL template may be used to dynamically generate a tracking URL that collects the required tracking information. When an administrator creates and/or manages a particular campaign, the administrator selects one or more tracking URL templates from a candidate pool of tracking URL templates. The selected tracking URL templates are therefore "enabled" for the particular campaign. When a post designer generates a post under the particular campaign, a dynamic link generator generates a tracking URL that is configured to collect tracking information requested by any of the enabled tracking URL templates. The tracking information may be transmitted to the tracking services associated with the enabled tracking URL templates.

One or more embodiments include generating a tracking URL configured to redirect a consumer to one of a candidate set of destination URLs. A consumer clicks on a short URL presented in a post. The short URL is resolved to an Internet Protocol (IP) address of a mapping server. The mapping server maps the short URL to a tracking URL, which includes a base URL and a query string. The base URL is resolved to an IP address of a server of a particular tracking service. The query string includes tracking parameters configured to collect tracking information for one or more tracking services. Based at least on (a) information related to the tracking URL of a particular campaign and/or (b) information related to the consumer, the particular tracking service selects one of a candidate set of destination URLs associated with the tracking URL. The selected destination URL directs a request to an associated destination page, which is presented to the consumer.

Information related to the tracking URL include, for example, the identifier (ID) of the post, the ID of the campaign of the post, a number of times that the tracking URL (and/or a short URL associated therewith) was clicked, a number of times that any posts of the particular campaign were clicked, through which channels and/or social media platforms the clicks originated from, a number of orders resulting from the clicks, and/or a number of times a particular landing page was presented in response to the clicks.

Information related to the consumer include, for example, the consumer's interaction history with the campaign, the consumer's browsing history, the consumer's purchasing history, the consumer's browser type, the channel and/or social media platform on which the consumer interacted with the post, and/or a landing page previously presented to the consumer in response to the consumer clicking on the tracking URL (and/or a short URL associated therewith).

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

Figure 1:
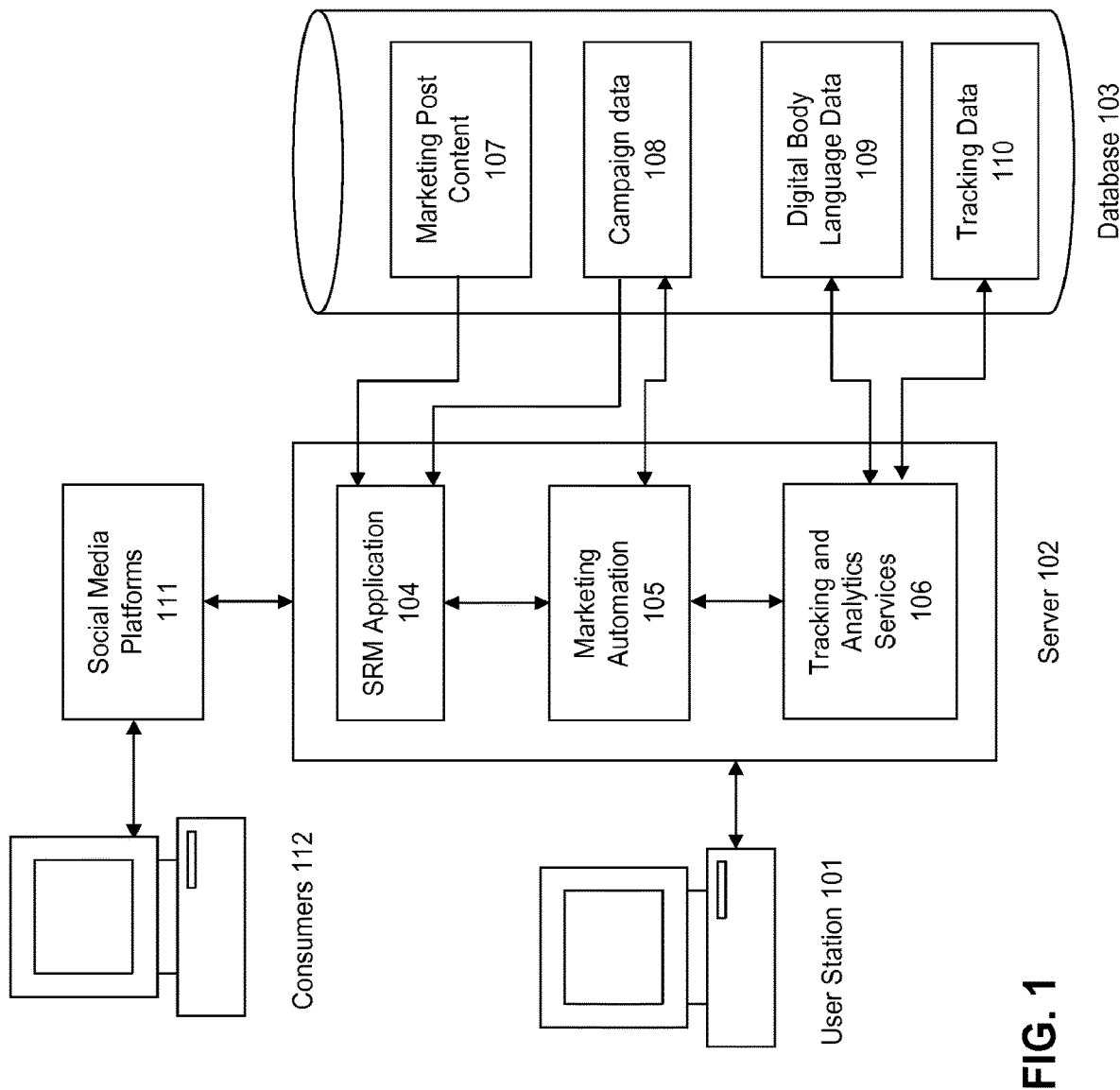
FIG. 1 illustrates an architecture of implementing tracking digital body language in accordance with some embodiments.

Embodiments of the invention provide an improved approach for tracking consumer digital body language. Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments. In addition, for the purposes of illustration and explanation, the present disclosure is described in various embodiments in the context of SRM applications. It is noted, however, that the invention is not limited in its scope to SRM applications, and indeed, may be applied to other types of applications as well.

FIG. 1 shows an architecture of a system 100 according to some embodiments. The users (e.g., marketers) operate the system at a user station 101 to access and utilize applications on an application server 102, such as an SRM application 104, marketing automation application 105, and tracking and analytics services 106. Applications and services on server 102 may access data on database 103, which may include marketing post data 107, campaign data 108, consumer digital body language information 109, and tracking information 110. As described in more detail below, the users at user station 101 may use SRM application 104 to create and/or manage posts and messages for various social media sites or platforms. In some embodiments, the posts or messages are created using data from marketing post data 107, which may contain graphics or videos to be displayed, standardized text, post templates, or other types of content that may be used in creating a post or message.

SRM posts and messages created with SRM application 104 are often associated with campaigns or promotions. In some embodiments, parameters for campaigns may be specified using marketing automation application 105 and stored as campaign data 108. When a user specifies a campaign when creating a post using SRM application 104, parameters associated with the campaign may be automatically retrieved from campaign data 108 through marketing automation application 105. In addition, marketing automation application 105 may be used in some embodiments to designate landing pages and base URLs to be associated with the posts, which is explained in further detail below.

Some posts may contain a URL that, when clicked on by a consumer, takes the consumer to another webpage, such as a page describing a marketing campaign or promotion. In order to be able to track consumer behavior, the URL may be a tracking URL with one or more tracking parameters. In some embodiments, tracking URLs may be dynamically generated using a tracking URL template. An example system and method for creating tracking link templates for dynamically generating tracking URLs is described in U.S. patent application Ser. No. 14/491,387, "Method and System for Implementing Dynamic Link Tracking", which is hereby incorporated by reference in its entirety. In some embodiments, tracking and analytics services 106 are used to define tracking URL templates that are able to be used with the services.

Posts created by a user at user station 101 using SRM Application 104 are published to one or more social media platforms 111, where they may be viewed by consumers 112. In additions to social media sites, posts may also be published to an email or a mailing list, or to a non-social media site (not shown). When a consumer 112 clicks on a tracking URL included with a post, tracking and analytics services 106 are used to track consumer clicks and consumer behavior, as well as redirect the consumer to the desired destination URL or landing page.

Tracking and analytics services 106 may take tracking data 110 and digital body language data 109 in response to consumer behavior. Tracking data 110 typically keeps track of consumer URL clicks, and may be used by a marketer for analyzing consumer response to a post. For example, tracking data 110 may be used to determine how many consumers clicked a URL for a given post in a given time period, how many consumers clicked URLs associated with a certain campaign, through which channels/social media platforms the clicks originated from, how many orders resulted from the clicks, etc.

Digital body language data 109 typically tracks the behavior of individual consumers (e.g., a consumer's history of interactions with a marketer or marketing campaign). For example, digital body language data for a particular consumer may reflect whether the consumer has clicked any URLs relating to a particular campaign in the past, through what channels the consumer has interacted with the campaign, whether the consumer has ordered a product or service associated with the marketer, etc. This information may be used for lead scoring or performing more personalized actions for certain groups of consumers (e.g., sending a message about an upcoming promotion to consumers who have expressed interest in a particular campaign or interacted with the campaign in a particular way).

In system 100, user station 101 comprises any type of computing station that may be used to operate or interface with a server 102. Examples of such user stations 101 include for example, workstations, personal computers, laptop computers, or remote computing terminals. User station 101 may also comprise any type of portable tablet device, including for example, tablet computers, portable readers, etc., or mobile device that can suitably access an application on application server 102, such as smartphones and programmable mobile handsets. User station 101 usually includes a display device, such as a display monitor or screen, for displaying scheduling data and interface elements to users. User station 101 may also comprise one or more input devices for the user to provide operational control over the activities of system 100, such as a mouse, touch screen, keypad, or keyboard. The users may correspond to any individual, organization, or other entity that uses system 100 to remotely access applications on application server 102, such as an SRM application, a marketing automation application, and/or tracking and analytics services on application server 102.

The database 103 may correspond to any type of computer readable mediums or storage devices. The computer readable storage devices comprise any combination of hardware and software that allows for ready access to the data within the database. For example, the computer readable storage device could be implemented as computer memory or disk drives operatively managed by an operating system.

Figure 2A:
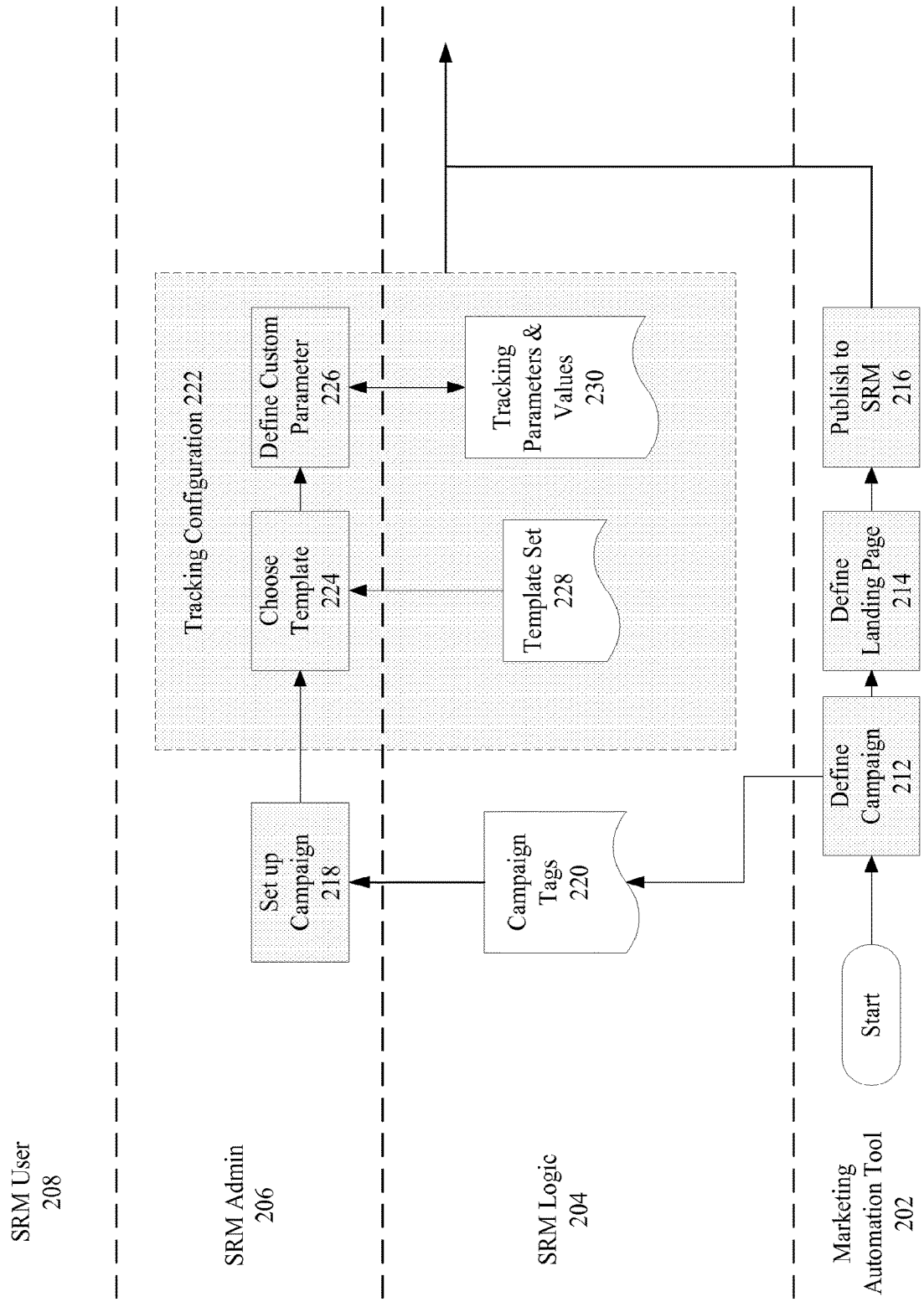
FIGS. 2A and 2B illustrate a system for implementing URL tracking and digital body language in accordance with some embodiments.
Figure 2B:
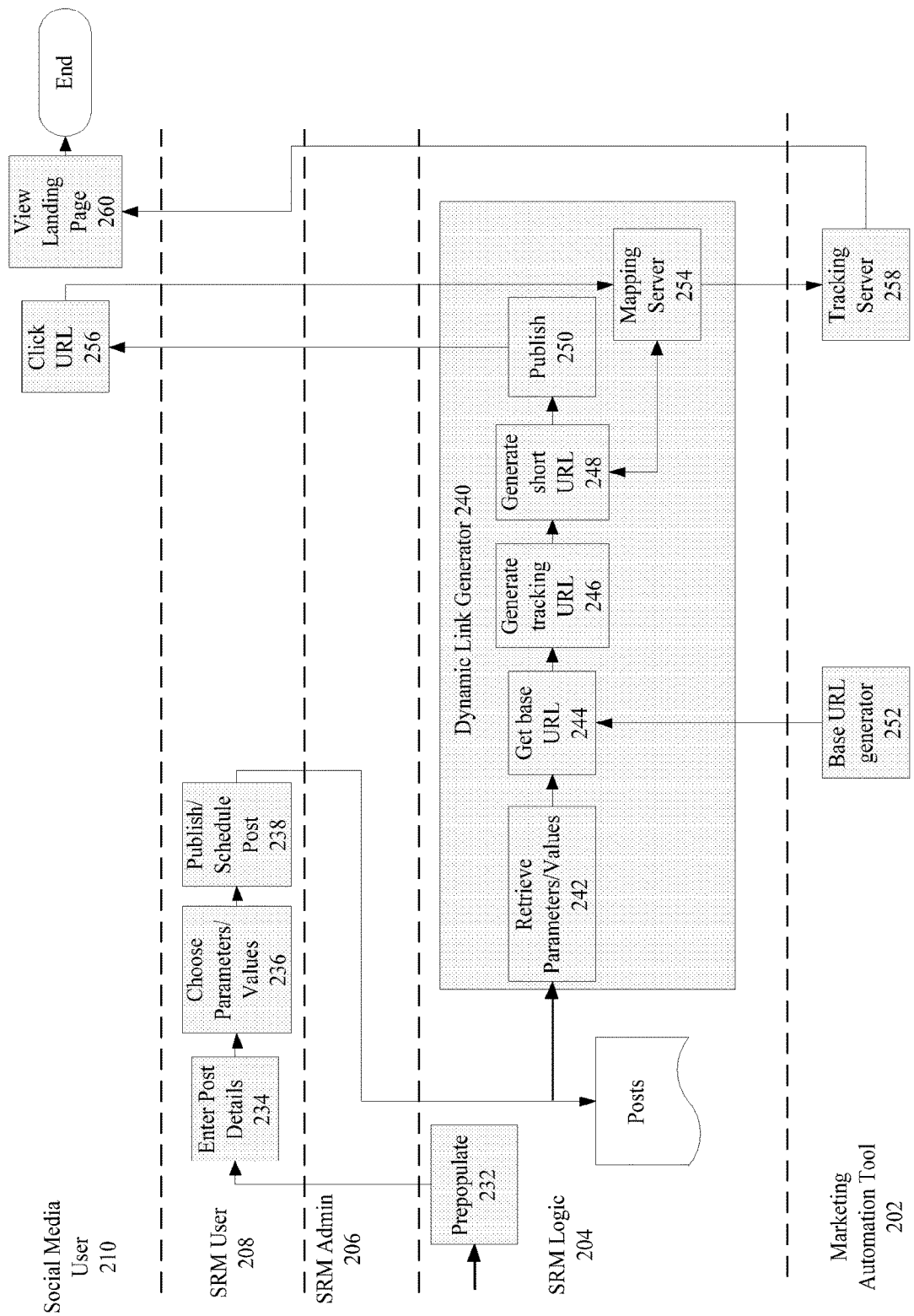

FIGS. 2A and 2B illustrate a system for implementing URL tracking and digital body language in accordance with some embodiments. In the illustrated embodiment, SRM administrators 206 and SRM users 208 operate on SRM logic 204 and marketing automation program 202 to define campaigns and publish social media posts and messages, which are then viewed by social media users or consumers 210. While the illustrated embodiment shows SRM administrators 206 as responsible for setting up and defining a campaign, while SRM users 208 create the social media posts and messages associated with the campaign, it is understood that in other embodiments, other roles and configurations may be possible (e.g., an SRM administrator may both set up a campaign and create posts for the campaign). In addition, while the figures refer primarily to social media posts, the techniques disclosed herein may also be applied to other types of posts, e.g., posts sent through email, or posted on sites that are not social media sites.

As most SRM posts are associated with a campaign or promotion, before creating an SRM post, a campaign must be typically be set up first. In some embodiments, parameters for the campaign, such as campaign name, term, description, etc. may be defined using marketing automation tool 202 at 212. Defining a campaign may comprise creating or specifying one or more campaign IDs and/or campaign tags, such as a campaign ID number, campaign name, term, description, and/or other properties associated with the campaign. These campaign IDs and tags may be automatically mapped and stored at the SRM application level to set up the campaign at the SRM application through a campaign setup API. For example, as illustrated in FIG. 2A, once a campaign has been defined at 212, an SRM administrator 206 may use campaign tags 220 to set up the campaign at 218 at the SRM application for which the SRM posts will be associated with.

Following campaign definition, the marketing automation application 202 may, in some embodiments, also be used to define one or more landing pages 214, i.e. pages to be reached by clicking on a URL in an SRM post. In some embodiments, SRM posts may also use landing pages other than those defined using the marketing automation application 202 at 214.

At 222, the campaign is associated with one or more tracking URL templates, which are used to create tracking URLs for SRM posts. Because different tracking services (e.g., Google Analytics, Eloqua, etc.) may recognize different parameter formats, a tracking URL template is chosen at 224 that is compatible with the tracking service being used. The template may be created by the SRM administrator, or selected from a set of existing templates 228. In an embodiment, multiple tracking URL templates are generated and/or selected in order to collect tracking information for multiple tracking services being used.

A tracking URL template may define a plurality of post parameters relating to a post that the URL is associated with, such as a post ID, social media site the post was posted on, campaign the post is associated with, time stamp of post, etc. In addition to standard post parameters, the tracking URL template may also contain one or more custom parameters and values, which may be defined at 226. Custom parameters may include parameters useful for tracking analysis but are not part of the content of the actual posts. These may include campaign details, landing page type, content style, post objective, a user memo, etc. In some embodiments, the custom parameters correspond with the campaign tags 220 defined by the SRM administrator 206 when setting up the campaign. In addition, in some embodiments custom parameters not associated with campaign tags 220 may also be specified.

Based on the selected tracking URL templates and the defined custom parameters, a set of tracking parameters for the campaign are identified at 230. The set of tracking parameters includes (a) the tracking parameters for each selected tracking URL template and (b) the customer parameters. As an example, a tracking URL template may include a tracking parameter for browser type. Another tracking URL template may include a tracking parameter for social media platform. If both tracking URL templates are selected, then a set of tracking parameters for the campaign may include both the browser type parameter and the social media platform parameter.

In an embodiment, tracking parameters for each selected tracking URL template are deduplicated when generating the set of tracking parameters for the campaign. A table may be used to indicate which tracking parameters of different tracking URL templates may be considered as equivalent. As an example, a first tracking URL template may use the tracking parameter "browser" to collect browser type information. A second tracking URL template may use the tracking parameter "br_type" to collect the same browser type information. If both tracking URL templates are selected, then the SRM Logic 204 may retrieve a table from a data repository to perform deduplication. The SRM Logic 204 may compare the tracking parameters of the two tracking URL templates with the entries in the table. The SRM Logic 204 may determine that "browser" or the first tracking URL template and "br_type" of the second URL template are duplicates. The SRM Logic 204 may include "browser" in a set of tracking parameters for the campaign, without including "br_type" in the set of tracking parameters for the campaign.

Once the tags, tracking template, and custom parameters for the campaign have been defined, the campaign may be published to the SRM at 216 so that SRM users 208 are able to create posts and messages associated with the campaign.

The SRM application is used by an SRM user 208 to create a post. When post creation is initialized, campaign tags and destination URLs corresponding to landing pages may be retrieved automatically at 232 from the marketing automation application 202 and pre-populated into the post creation interface. The SRM user may then enter additional post details, such as post text, as well as pictures, videos, or other media content at 234. A destination URL for a landing page may also be specified if one was not pre-populated from the marketing automation application 202. In some embodiments, an SRM user may also choose to override any pre-populated values with new values.

The SRM user 208 may also choose values for one or more custom parameters to be included in a tracking URL at 236. In some embodiments, some of the custom parameters, such as campaign tags, may have already been pre-populated. The post may then be saved and scheduled for publishing at 238.

When publishing a post containing a URL, a tracking URL is dynamically generated to be included in the post by a dynamic link generator 240. First, post parameters and custom parameter values are retrieved from the post at 242, and formatted in accordance with the tracking URL template corresponding to the campaign. In some embodiments, post parameters (e.g., stream to be published to, post ID, time stamp, etc.) are automatically determined from the post details, while custom parameters are determined from the user inputs or pre-populated fields.

In an embodiment, multiple tracking URL templates are enabled for the campaign. The dynamic link generator 240 generates a tracking URL based on all enabled tracking URL templates. The tracking URL includes post parameters for all enabled tracking URL templates.

In some embodiments, the dynamic link generator 240 may retrieve a base URL from a base URL generator 252 in the marketing automation application 202. In some embodiments, the base URL corresponds to the tracking service to be used. The base URL is combined with the tracking URL template and retrieved parameters to form a complete tracking URL at 246.

At 246, values for some retrieved parameters may be known and therefore populated at the time the tracking URL is generated. As an example, values for parameters such as campaign ID and post ID may be known and populated for the tracking URL. Values for parameters such as browser type of a consumer may be unknown. Such parameters may remain blank or include default values in the tracking URL.

In some embodiments, a short URL is generated from the tracking URL at 248. A short URL may be used in some cases to satisfy social media character limits, or to create a more aesthetically pleasing and more compact URL to be displayed. The short URL may be generated using a URL mapping server 525, which may also store a mapping between the tracking URL and the generated short URL. The short URL is then published with the post at 250.

When a consumer or social media user 210 views a published post and selects the short URL associated with the post at 256, the short URL is resolved to an IP address of the URL mapping server 254. The browser of the social media user 210 may initiate a Transmission Control Protocol (TCP) connection with the URL mapping server 254. The browser transmits a request to the URL mapping server 254. The short URL may be referred to herein as "directing a request" to the URL mapping server 254. The URL mapping server 254 retrieves the full tracking URL that is mapped to the short URL. Values for tracking parameters included in the tracking URL that were previously not populated may now be populated. As an example, values for parameters such a browser type of the social media user 210 may be populated in the tracking URL. Additionally, the tracking URL may include a base URL, which is resolved to an IP address of a tracking server 258. A TCP connection between the URL mapping server 254 and the tracking server 258 may be established. The URL mapping server 254 transmits a request to the tracking server 258. The tracking URL (and/or the base URL) may be referred to herein as "directing a request" to the tracking server 258. The tracking server 258 processes the request. Processing the request includes parsing and/or analyzing the tracking parameters of the tracking URL.

This may be used to form aggregated tracking data relating to the campaign or social media post. The aggregated tracking data may include, for example, the identifier (ID) of the post, the ID of the campaign of the post, a number of times that the tracking URL was clicked, a number of times that any posts of the particular campaign were clicked, through which channels and/or social media platforms the clicks originated from, a number of orders resulting from the clicks, and/or a number of times a particular landing page was presented in response to the clicks.

In addition, tracking server 258 attempts to identify the social media user 210, in order to form a digital body language profile for the user, recording the interactions of individual users with the campaign. For example, the digital body language profile of the user may comprise from which channels the user clicked from, the landing pages visited by the user, the context from which the landing pages were visited from, the campaigns associated with the visited landing pages, the consumer's interaction history with the campaign, the consumer's browsing history, the consumer's purchasing history, the consumer's browser type, the channel and/or social media platform on which the consumer interacted with the post, and/or a landing page previously presented to the consumer in response to the consumer clicking on the tracking URL.

In an embodiment, the tracking server 258 identifies the social media user 210 using a cookie. A cookie associated with the browser, device, or other system of the social media user 210 may be detected when the social media user 210 clicks on a URL. The tracking server 258 may determines whether any existing digital body language profile is associated with the cookie. If an existing digital body language profile is associated with the cookie, then additional digital body language is stored into the existing digital body language profile. If there is no existing digital body language profile associated with the cookie, then a new digital body language profile may be generated. The digital body language gathered from the tracking URL may be stored into the new digital body language profile.

In an embodiment, the tracking server 258 collects information from the tracking parameters of the tracking URL and stores the information in a database. The tracking server 258 generates at least two indices for the database. One index is based on the tracking URL. The other index is based on the social media user 210. Hence, the tracking server 258 may retrieve tracking data about a particular tracking URL using the tracking URL index. Additionally, the tracking server 258 may retrieve digital body language about a particular social media user 210 using the social media user index.

In an embodiment, multiple tracking services are used. A tracking URL template for each tracking service is enabled. Tracking parameters for all enabled tracking URL templates are included in a tracking URL. When a consumer clicks on a link presented on a post, the link is resolved to a URL mapping server 254. The URL mapping server 254 maps the link to the tracking URL including the tracking parameters for all enabled tracking URL templates. The SRM Logic 204 determines which tracking parameters are relevant to which tracking services. The SRM Logic 204 identifies tracking information collected using a particular subset of tracking parameters that is relevant to a particular tracking service. The SRM Logic 204 transmits the tracking information to a server of the particular tracking service. The SRM Logic 204 may transmit the tracking information collected by the particular subset of tracking parameters by making a call to an application interface (API) associated with the particular tracking service. Hence, while a tracking URL may include a base URL that resolves to a first tracking service, the tracking URL may include tracking parameters for collecting tracking information for the first tracking services and other tracking services. The tracking information for the other tracking services may be transmitted in the form of an API call to the other tracking services.

The tracking server 258 also processes the request directed from the URL mapping server URL 254 by identifying a destination URL (e.g., a URL of the landing page). The destination URL is resolved to an IP address of a server that hosts a destination or landing page. A TCP connection between the tracking server 258 and the server hosting the destination page may be established. The tracking server 258 transmits a request to the server hosting the destination page. The destination URL is referred to herein as "directing a request" to the server hosting the destination page. The server hosting the destination page processes the request. Processing the request includes sending a response back to the tracking server 258, wherein the response includes the landing page. The tracking server 258 sends a response back to the URL mapping server 254. The URL mapping server 254 transmits a response back to the browser of the consumer 210. Based on the response, the landing page is loaded and presented on the browser. The tracking server 258 thereby redirects the consumer 210 to the destination URL, allowing the consumer 210 to view the landing page at 260.

In some embodiments, the tracking server 258 may, based upon the tracking data of the tracking URL and/or the digital body language of the consumer, redirect the consumer to a landing page containing different content (e.g., a different landing page, or an altered or customized landing page). For example, consumers who clicked from a first social media channel may be redirected to a landing page containing different content as consumers who clicked from a second social media channel. In addition, the consumers from the first social media channel may be associated with a particular marketing workflow path, where they are targeted with different types of marketing compared to the consumers from the second social media channel. The tracking data and/or digital body language used to determine a destination URL may include information collected by a single tracking service, or may include information aggregated from multiple tracking services. It is understood that other factors may also be used in considering which landing page to direct the consumer and/or determining a marketing workflow path flow for the consumer, such as the identity of the consumer, whether or not the consumer has interacted with the campaign before, other campaigns the consumer has interacted with, whether the consumer has purchased a product or service, preference settings by the consumer, consumer location, etc.

When multiple consumers click on a same link of a particular post of a particular campaign, the link is resolved to the same IP address of the URL mapping server 254. The URL mapping server 254 maps the link, clicked by the different users, to the same tracking URL. The tracking URL includes a base URL, which resolves to the same IP address of the tracking server 258. Therefore, a link clicked by different consumers resolves to the same IP address of the tracking server 258. However, the tracking server 258 may determine different destination URLs for the different consumers based on tracking data and/or digital body language. Therefore, even though the tracking URL is the same for multiple consumers, the destination URLs (and therefore the destination pages) for the consumers may be different.

When one or more consumers click on a same link of a particular post of a particular campaign multiple times, the link is resolved to the same IP address of the URL mapping server 254. The URL mapping server 254 maps the link to the same tracking URL each time. The tracking URL includes a base URL, which resolves to the same IP address of the tracking server 258. Therefore, a link clicked multiple times resolves to the same IP address of the tracking server 258. However, the tracking server 258 may determine different destination URLs for the different clicks made at different points in time based on tracking data and/or digital body language. Therefore, a click on a link made at the beginning of a campaign may redirect to a different destination URL than a click on the same link at a later stage of the campaign.

As an example, a consumer may click on a link in a post posted on the social media platform, Facebook.com. The link is mapped to a tracking URL, which includes a base URL. Based on the base URL, a request is directed to a tracking server.

The tracking server may determine tracking data associated with the tracking URL, such as, a number of times the tracking URL was clicked, and the number of clicks originating from each social media platform. The tracking server may determine that a large proportion of prior clicks associated with the tracking URL originate from Facebook.com. The tracking server may determine that the proportion of prior clicks originating from Facebook.com exceeds a predefined threshold value.

Additionally, the tracking server may determine digital body language associated with the consumer, such as, the number of times that the consumer has interacted with the campaign, and the purchasing history of the consumer. The tracking server may determine that a series of posts associated with the campaign that were presented to the consumer through various channels and/or social media platforms. The tracking server may determine which of the series of posts gained the consumer's attention. For example, the consumer may have played a video associated with the third post that was presented to the consumer; and the consumer may have clicked on the sixth, seventh, and eighth post that was presented to the consumer. The tracking server may determine a trend associated with the consumer's interaction with the campaign. The trend may indicate that the consumer's interaction is increasing over time.

The tracking server may determine that a candidate pool of destination URLs are associated with the tracking URL. Hence, the consumer should be redirected to one of the candidate pool of destination URLs, based on the consumer's interaction with the post that generated the tracking URL. The tracking server may input the tracking data associated with the URL and the digital body language associated with the consumer into a function. The function selects one of the candidate pool of destination URLs. For example, based on (a) the proportion of prior clicks originating from Facebook.com exceeds a predefined threshold value and (b) the consumer's interaction history indicating that the consumer's interaction with the campaign is increasing over time, the function may select a particular destination URL corresponding to a particular destination page. The particular destination page may include a design that matches the design of Facebook.com. The particular destination page may include icons of items offered for sale. The tracking server may redirect the consumer to the selected destination URL. Based on the selected destination URL, a corresponding destination page is presented to the consumer.

As another example, a consumer may click on a link in a post posted on the social media platform, Facebook.com. The link is mapped to a tracking URL, which includes a base URL. Based on the base URL, a request is directed to a tracking server.

The tracking server may determine tracking data associated with the tracking URL. Additionally, the tracking server may determine digital body language associated with the consumer. Additionally, the tracking server may determine that a candidate pool of destination URLs are associated with the tracking server. Based on the tracking data and digital body language, the tracking server may determine a respective score associated with the candidate pool of destination URLs. The tracking server may select the destination URL associated with the highest score. The tracking server may redirect the consumer to the selected destination URL. Based on the selected destination URL, a corresponding destination page is presented to the consumer.

Figure 3:
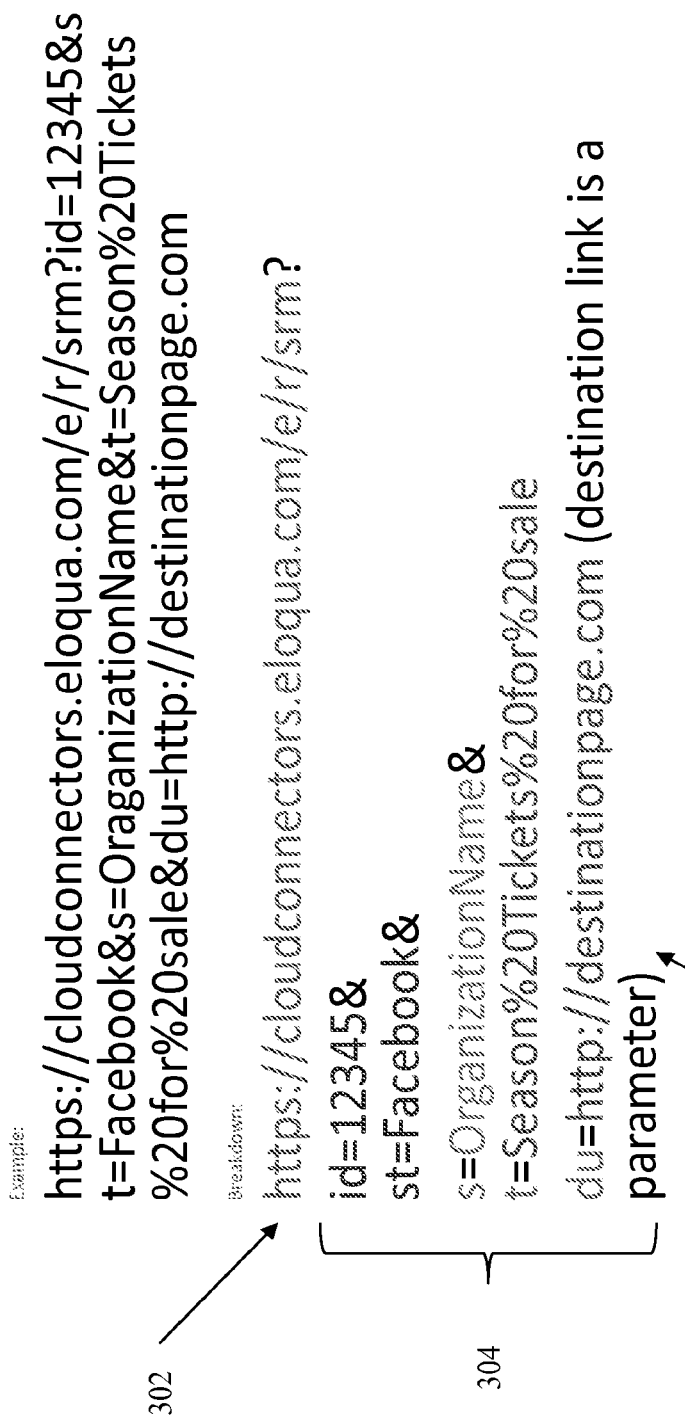
FIG. 3 illustrates an example tracking URL in accordance with some embodiments.

FIG. 3 illustrates an example tracking URL in accordance with some embodiments, comprising a base URL 302 and a query string 304. In some embodiments, the base URL 302 points to a URL for the tracking service (e.g., Eloqua). A request associated with the tracking URL is directed to the tracking service based on the base URL 302. The query string 304 is appended to the base URL 302 may include various tracking parameters such as post ID, social media platform published on, post source, promotion, etc. The query string 304 may include tracking parameters for one or more tracking URL templates that are enabled for the campaign.

Optionally, the destination URL 306 corresponding to a landing page is specified as part of the parameters of query string 304. When parsing the wrapped URL, the tracking service extracts the destination URL 306 from query string 304, and redirects the consumer to the landing page corresponding to the destination URL 306. In other embodiments, the tracking service may select one of a candidate pool of destination URLs based on tracking data and/or digital body language. The consumer is then redirected to the selected destination URL. The destination page corresponding to the selected destination URL is loaded and presented to the consumer.

It is understood that although the figure illustrates a particular tracking URL format, other types of tracking URL formats may be used depending the tracking service and/or selected template.

Figure 4:
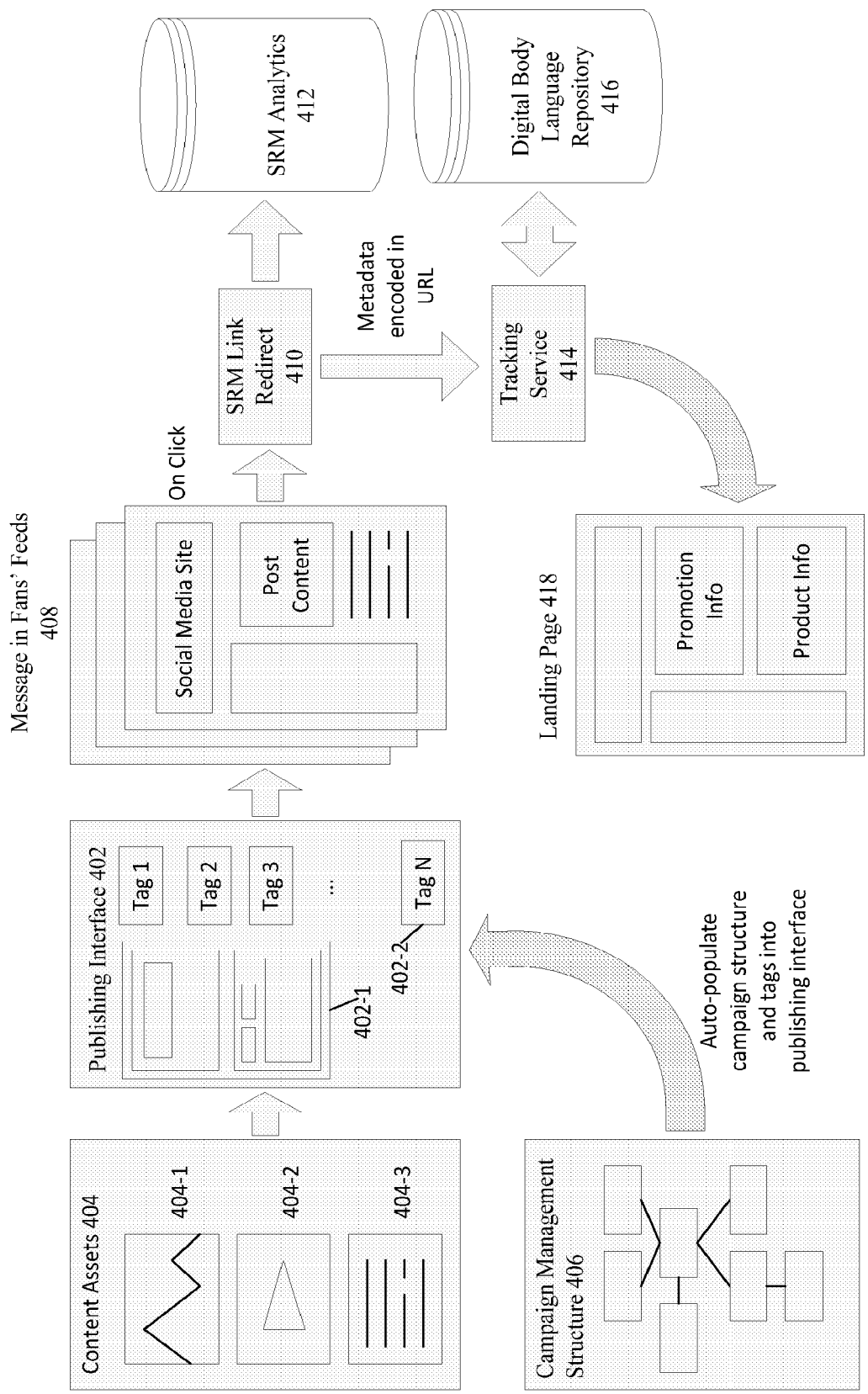
FIG. 4 illustrates a process for implementing URL tracking and digital body language in accordance with some embodiments.

FIG. 4 illustrates a process for implementing URL tracking and digital body language in accordance with some embodiments. As illustrated in the figure, a user may use a UI 402-1 at a publishing interface 402 to create a post or social media message. Publishing interface 402 may be used to retrieve content assets 404 (e.g., pictures 404-1, videos 404-2, or text 404-3) to include as part of the post or message. In addition, publishing interface 402 may be used to retrieve one or more tracking URL templates and one or more tags 402-2, wherein the templates and tags correspond to a campaign structure generated by marketing automation application 406. Thus, posts created using publishing interface 402 can be associated with a particular campaign or promotion. The retrieved campaign tags 402-2 may include campaign name, ID, description, and/or other campaign properties. In addition to tags retrieved from marketing automation application 406, the user may also choose to define one or more custom parameters to be associated with the post. These tags and parameters may then be used with the retrieved tracking URL templates to construct a tracking URL.

The retrieved content and tags are combined with user-inputted data at UI 402-1 to form a published post or message 408 one or more social media platforms (e.g., Facebook, Twitter, etc.). For example, a post may be published to a marketer's Facebook page, which then shows up in the feeds of consumers who are fans of the page. Alternatively, the post may be sent to consumers on a mailing list, or be viewed by consumers on other types of sites (e.g., an online bulletin or forum, the marketer's own web page, etc.).

When a consumer clicks on a URL in a published post or message 408, the URL is received by a link redirect server 410. The link redirect server may parse the URL and pass tracking parameters extracted from the URL to an analytics service 412, which uses the received parameters to analyze consumer clicks of the URL. For example, the analytics service 412 may be used be determine the number of consumer clicks on a particular post, or on posts associated with a particular campaign. Additional parameters from the tracking URL may be used to provide analysis (e.g., compare clicks originating from a Facebook post to clicks from a Twitter post).

The URL may also be passed to a tracking service/digital body language server 414. Digital body language server 414 attempts to identify the consumer and any existing body language data associated with the consumer. In some embodiments, the digital body language server 414 attempts to identify the consumer by determining if the consumer has a tracking cookie. If there is no cookie, a cookie may be dropped on the consumer's system, allowing for the consumer to be identified in the future. If a cookie already exists, it is matched with consumer information in a digital body language repository 416. The new tracking information for the consumer resulting from the URL click is stored in the repository and associated with any existing information regarding the consumer. The digital body language server 414 then redirects the consumer to the landing destination page.

It is understood that in other embodiments, other techniques or combinations of techniques may be used to track or identify a particular consumer. For example, in some embodiments, consumers may also be tracked by identifying an account they are logged into when clicking the URL (e.g., a Google account, a Facebook account, an email account, etc.).

The consumer information stored in the digital body language repository 416 provides a record of the consumer's past digital interactions with the marketer. For example, if the consumer has clicked on other posts published by the marketer in the past, this may be reflected in the consumer's digital body language. In addition, if the consumer fills out a form, places an order, or otherwise interacts with the landing page, the consumer's actions may also be recorded. The repository 416 may also store consumer contact information or other information that has been provided by the consumer (e.g., through filling out a form).

By analyzing digital body language in conjunction with tracking URLs, the digital body language repository 416 is able to not only determine what pages a consumer has visited, but also how the consumer reached those pages. For example, in addition to being able to know that a consumer has reached a particular landing page, it can also be determined through which social media channel (e.g., Facebook, Twitter) the consumer reached the landing page, as well as the context from which the page was reached (as defined by the parameters of the tracking URL).

Furthermore, digital body language allows for behavior of consumers beyond individual clicks to be tracked. For example, if a consumer clicks on a tracking URL but does not purchase a product, but instead purchases a product at a later time, this may be reflected in the consumer's digital body language. The stored digital body language profiles may also be later used for further analysis and reporting. Because the digital body language data is associated with consumers on an individual level, more detailed data on consumer behavior can be obtained. For example, it may be determined through analysis that consumers who have interacted with a campaign in a particular way may be more likely to buy particular products at a later date, or be more receptive to particular types of marketing.

Thus, the consumer's digital body language provides a marketer with valuable information on the consumer, such as how they can be contacted, and which products, campaigns, or promotions they have been interested in the past. This may be used by the marketer for lead scoring purposes, or to personalize marketing actions toward the consumer. For example, the marketer may wish to send a message to consumers who have demonstrated interest in a past campaign, informing them of a new promotion. The message may further be customized depending upon in what manner the interest was expressed. A marketer may also wish to display different content on a landing page depending on whether a consumer is known to have been exposed to a particular campaign before or not (e.g., has the consumer clicked on a URL associated with the campaign before?). For example, a landing page may display "Welcome back!" if the consumer is known to have clicked on a URL associated with the campaign before. In some embodiments, the consumer may be redirected to different landing pages based upon other aspects of their digital body language information (e.g., the identity of the consumer, or the social media channel used that the consumer clicked from). Thus digital body language can be used by marketers to shape their understanding of and future interactions with individual consumers.

The tracking and digital body language services operate behind the scenes, such that when the consumer clicks the URL, they are redirected to the landing destination page 418 without knowledge of the tracking and digital body language functions that operate in the background.

Figure 5:
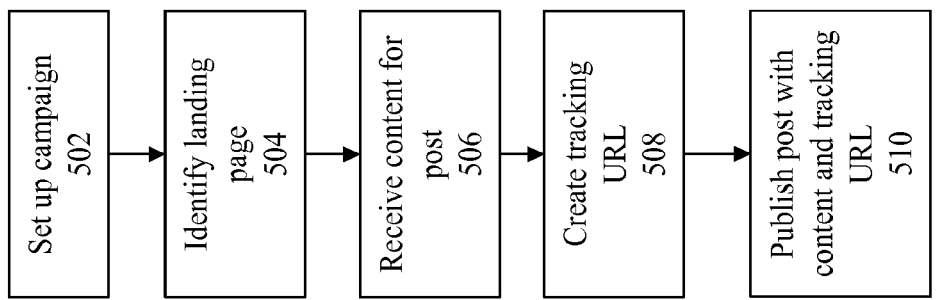
FIG. 5 illustrates a flowchart of a process for creating an SRM post in accordance with some embodiments.

FIG. 5 illustrates a flowchart of a process for creating an SRM post in accordance with some embodiments. At 502, the user sets up a campaign. This may comprise specifying various campaign tags and parameters, such as campaign name, ID, term, description, etc. In addition, one or more tracking URL templates may be associated with the campaign. At 504, one or more landing pages associated with the campaign may be defined, which correspond to destination pages that a consumer reaches after clicking on a URL in a published post associated with the campaign.

At 506, content for a post may be received. This may include user-specified content to be displayed (e.g., text, pictures, etc.), one or more tracking URL templates to be used to generate a tracking URL, and/or user-specified custom parameters. In some embodiments, some of the parameters to be associated with the post may be pre-populated. For example, if the post is associated with a particular campaign, the various campaign tags created during campaign setup may be received automatically.

At 508, a tracking URL is created from the post parameters and custom parameters specified by the post content. The received parameters are used to populate one or more tracking URL templates. In some embodiments, a base URL may be received that corresponds to the tracking service to be used. The base URL and formatted parameters are combined to generate the tracking URL. If multiple tracking URL templates are used, then the tracking parameters of each tracking URL template are appended together. Hence, the tracking URL includes the base URL, tracking parameters of a first tracking URL template appended thereto, tracking parameters of a second tracking URL template appended thereto, and so on until tracking parameters of all enabled tracking URL templates are included. In some embodiments, the tracking URL may be mapped to a short URL for publishing. At 510, the post, comprising post content and URL, are published to one or more social media sites.

Figure 6:
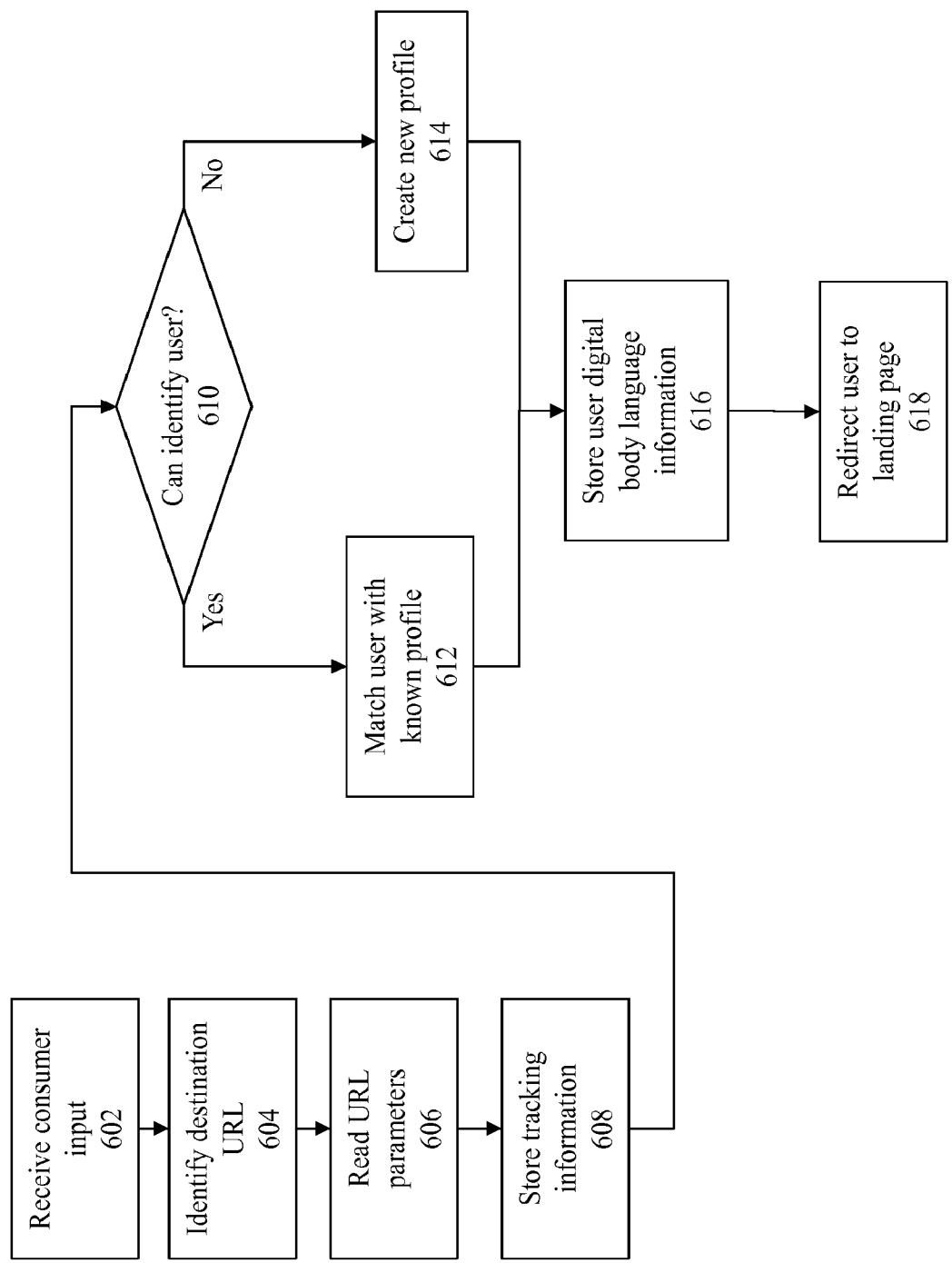
FIG. 6 illustrates a flowchart of a process for tracking and storing digital body language following a consumer click of a URL in accordance with some embodiments.

FIG. 6 illustrates a flowchart of a process for tracking and storing digital body language following a consumer click of a URL in accordance with some embodiments. At 602, an input from a consumer is received (e.g., a URL click). In some embodiments, the URL clicked is a short URL, in which case short URL to tracking URL mappings are used to determine the full tracking URL.

At 604, the tracking URL is parsed to identify a destination URL. In some embodiments, such as illustrated in FIG. 3, the destination URL is given as a parameter appended to a base URL, while in other embodiments the destination URL may correspond to the base URL. At 606, post parameters and/or custom parameters are read from the parsed tracking URL.

At 608, the identified parameters may be read by a tracking service for analysis. Tracking services may be used to track the number of clicks for particular posts or campaigns, to allow the marketer to assess the success of posts and campaigns by being able to view the clicks for a particular post or campaign. In some embodiments, tracking services may also be able to keep track of orders resulting from URL clicks. The identified parameters may be used by the marketer to further analyze and organize the information.

At 610, the tracking URL may be sent to a digital body language service, which attempts to identify the consumer and associate them with a digital body language profile, if one exists. In some embodiments, a determination is made as to if a tracking cookie is already present on the consumer system. If the consumer is identified (e.g., a tracking cookie already exists), the consumer is matched to a known profile at 612. The profile contains previous activities by the consumer. For example, if the consumer has clicked other URLs in posts made by the marketer, these may be reflected in the profile. Consumer actions on landing pages may also be recorded (e.g., if the consumer fills out a form or places an order). The profiles may also contain consumer information (e.g., consumer contact information received through a form or order). On the other hand, if the consumer is not matched with a known profile (e.g., a cookie is not found), a new profile may be created for the consumer at 612. In addition, a tracking cookie may be dropped on the consumer system so that the consumer may be identified in the future.

At 616, new digital body language information for the consumer may be stored and associated with the consumer profile, or used to create a new consumer profile if none currently exists. The stored digital body language profile for the user can be used by the marketer to analyze the behavior of individual consumers and determine future interactions with the consumer.

At 618, the consumer is redirected to the destination page. In some embodiments, the destination page may be changed or modified depending upon information retrieved from an existing consumer digital body language profile (e.g., redirecting a consumer to a different destination page if they have clicked on URLs relating to the campaign in the past). The destination page may also be changed or modified based upon received tracking URL parameters (e.g., channel), or a combination thereof.

Figure 7A:
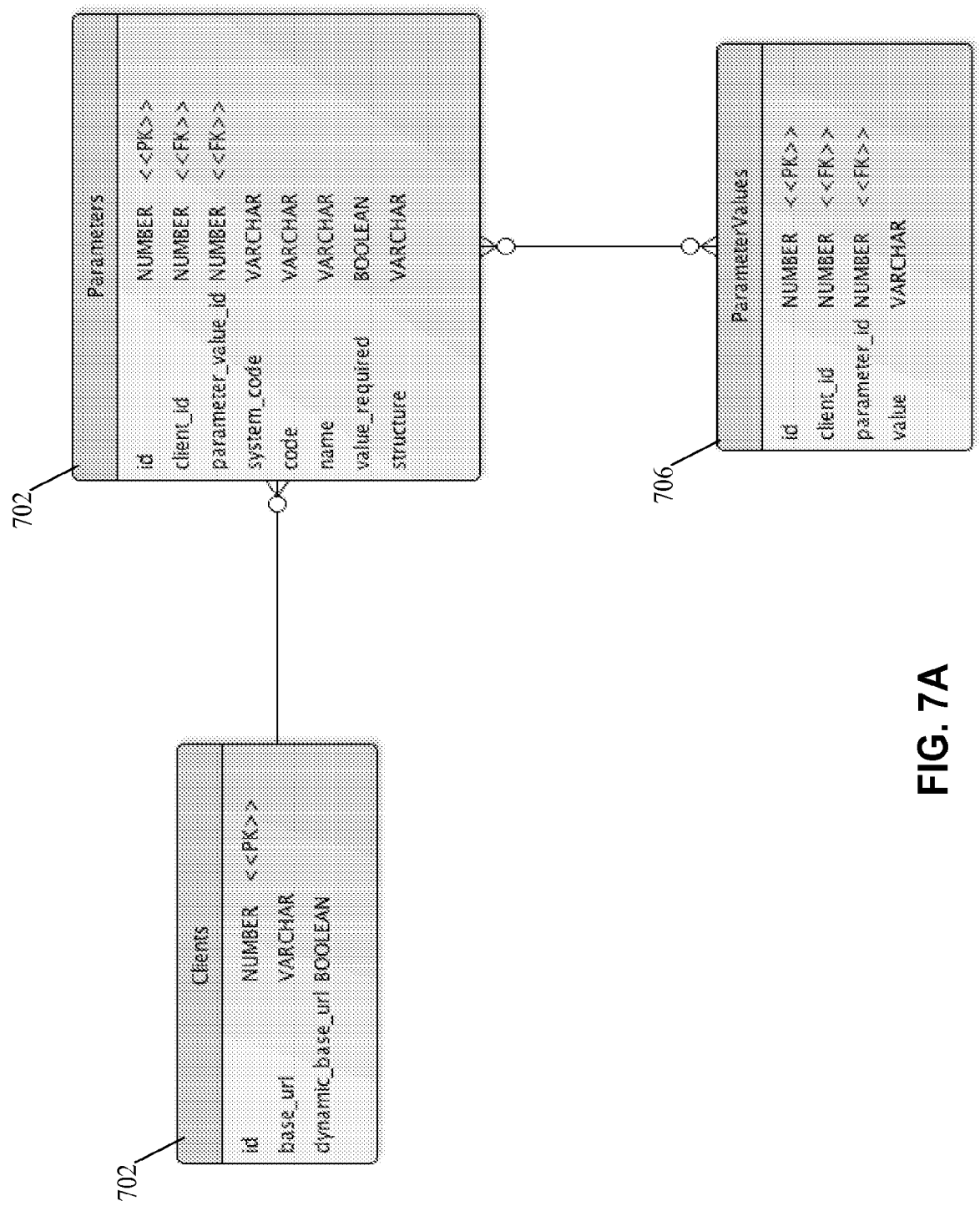
FIGS. 7A and 7B illustrate example database schemes that may be used in accordance with some embodiments.
Figure 7B:
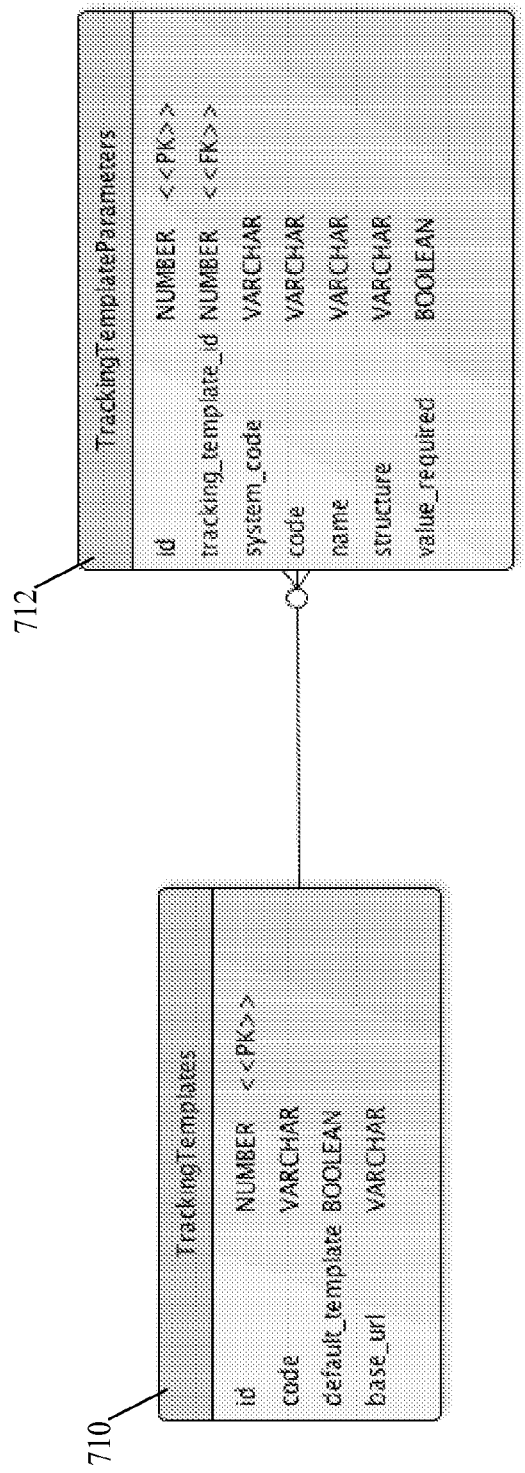

FIGS. 7A and 7B illustrate example database schemes that may be used in accordance with some embodiments. These schemes may be used to create tables to store marketer profiles and tracking link templates, store default parameters/values associated with each template, and store user-specified parameters/values. FIG. 7A illustrates an example scheme that may be used to store a profile for a marketer or other entity that may wish to use tracking templates or digital body language tracking. For example, each marketer, or "client" 702, may have an ID and a base URL associated with a tracking service. For example, different base URLs may correspond to different tracking services. In addition, a particular tracking service may be associated with multiple base URLs, and assign marketers to different base URLs based upon marketer size, location, tracking needs, or any other relevant criteria. Each marketer may also be associated with a plurality of parameters 704 corresponding to marketer information (e.g., name, address, contact information) and associated with one or more parameter values 706.

FIG. 7B illustrates an example scheme that may be used to store tracking URL templates. For example, each tracking URL template 710 may have an ID and code used to identify the template, a base URL associated with a tracking service, and an indication of whether the template is a default template. Each template 710 may be associated with one or more template parameters 712, which may include post parameters or custom user-defined parameters. Template parameters 712 may have different types of data structures and formats (e.g., text, numbers, etc.) and may be either mandatory parameters or optional parameters.

System Architecture Overview

Figure 8:
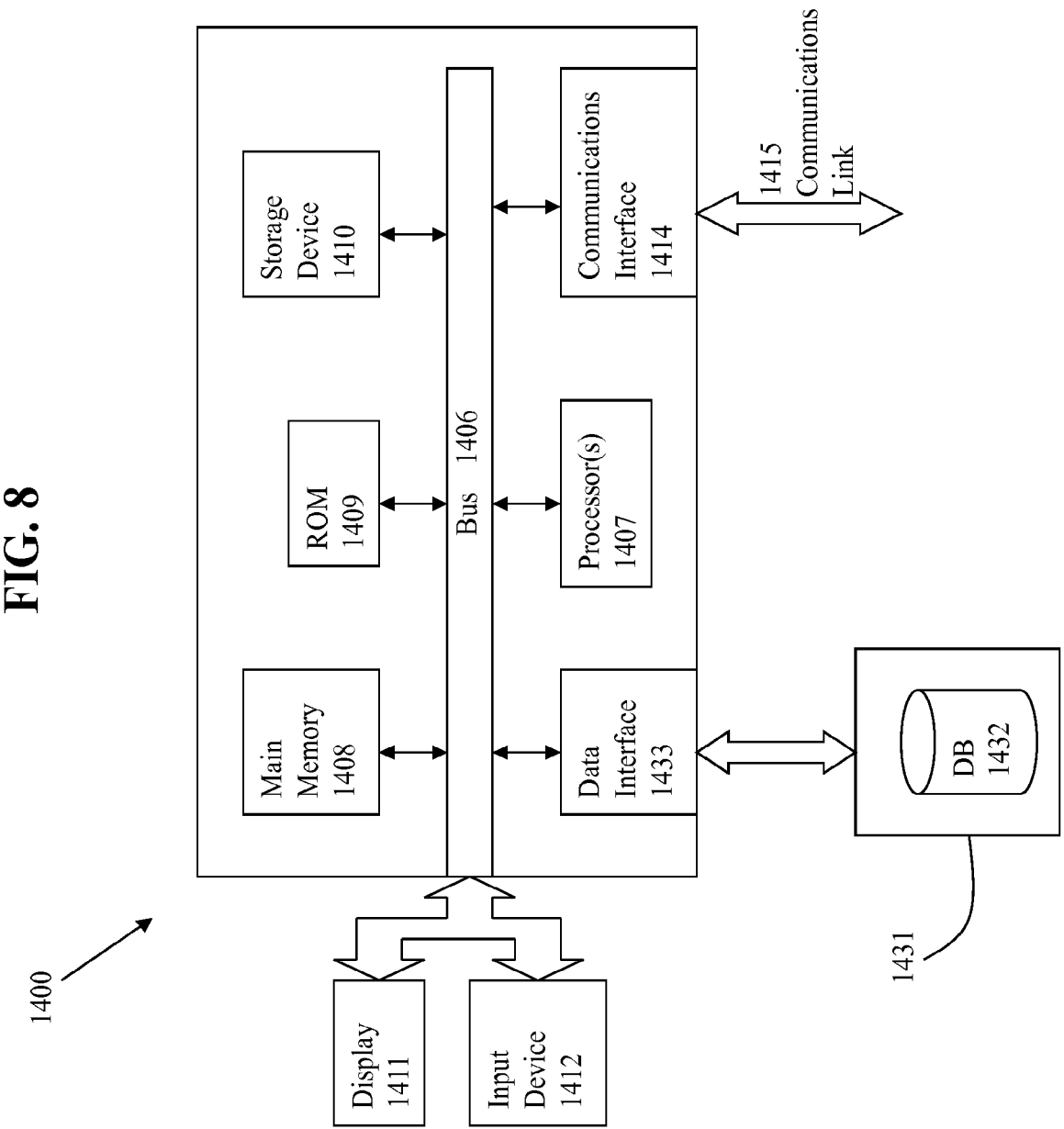
FIG. 8 illustrates a computerized system on which an embodiment of the invention can be implemented.

FIG. 8 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be stored in a database 1432 on a storage medium 1431 which is accessed through data interface 1433.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. One or more non-transitory machine-readable media storing instructions which, when executed by one or more processors, cause:
   identifying a plurality of tracking URL templates that are enabled for a campaign;
   identifying individual sets of tracking parameters respectively specified by the plurality of tracking URL templates, wherein the individual sets of tracking parameters are configured to pass tracking information to a plurality of tracking services, the individual sets of tracking parameters comprising:
      (a) a first set of tracking parameters specified by a first tracking URL template in the plurality of tracking URL templates and configured to pass tracking information to a first tracking service in the plurality of tracking services, and
      (b) a second set of tracking parameters specified by a second tracking URL template in the plurality of tracking URL templates and configured to pass tracking information to a second tracking service in the plurality of tracking services,
   wherein the first tracking URL template indicates a first parameter format, defined by the first tracking service, for the first set of tracking parameters;
   wherein the second tracking URL template indicates a second parameter format, defined by the second tracking service, for the second set of tracking parameters;
   the first parameter format being different from the second parameter format;
   the first set of tracking parameters comprising at least one tracking parameter that is not in the second set of tracking parameters;
   aggregating together the individual sets of tracking parameters respectively specified by the plurality of tracking URL templates to form an aggregated set of tracking parameters for the campaign;
   returning a tracking URL associated with a post for the campaign, wherein the tracking URL includes the aggregated set of tracking parameters;
   generating the post associated with the campaign, wherein the post includes a link that is mapped to the tracking URL;
   responsive to receiving user input indicating a selection of the link, sending tracking information to both (a) the first tracking service using the first set of tracking parameters in the first parameter format defined by the first tracking service and (b) the second tracking service using the second set of tracking parameters in the second parameter format defined by the second tracking service.

2. The one or more media of claim 1, wherein aggregating the individual sets of tracking parameters respectively specified by the plurality of tracking URL templates to form an aggregated set of tracking parameters for the campaign comprises:
   determining that a first tracking parameter in the first set of tracking parameters and a second tracking parameter in the second set of tracking parameters both are configured to pass a particular item of tracking information;
   deduplicating the individual sets of tracking parameters, at least by using a single tracking parameter configured to pass the particular item of tracking information, in place of both the first tracking parameter and the second tracking parameter, the single tracking parameter being one of the first tracking parameter, the second tracking parameter, or a third tracking parameter.

3. The one or more media of claim 1, wherein aggregating the individual sets of tracking parameters respectively specified by the plurality of tracking URL templates to form an aggregated set of tracking parameters for the campaign comprises:
   appending a first individual set of tracking parameters associated with a first tracking URL template, of the plurality of tracking URL templates, to a second individual set of tracking parameters associated with a second tracking URL template, of the plurality of tracking URL templates.

4. The one or more media of claim 1, wherein:
   the tracking URL further comprises respective values for at least a subset of the aggregated set of tracking parameters;
   the tracking information to be passed to the plurality of tracking services comprises the respective values for the at least a subset of the aggregated set of tracking parameters.

5. The one or more media of claim 1, further storing instructions which, when executed by the one or more processors, cause:
   subsequent to publishing the post associated with the campaign:
      determining respective values for at least a subset of the aggregated set of tracking parameters;
      populating the subset of the aggregated set of tracking parameters with the respective values;
   wherein the tracking information to be passed to the plurality of tracking services comprises the respective values for the subset of the aggregated set of tracking parameters.

6. The one or more media of claim 1, further storing instructions which, when executed by the one or more processors, cause:
   receiving a first request in response to a selection, by a consumer, of the link presented in the post;
   mapping the link to the tracking URL, wherein the tracking URL includes respective values populating the aggregated set of tracking parameters;

based on the tracking URL, passing the respective values populating the aggregated set of tracking parameters as the tracking information to the plurality of tracking services.

7. The one or more media of claim 1, wherein sending tracking information to both the first tracking service and the second tracking service comprises:
making a first request to a first application programming interface (API) of the first tracking service, wherein the first request comprises a first set of respective values populating a first subset of the aggregated set of tracking parameters as indicated by the tracking URL;
making a second request to a second API of the second tracking service, wherein the second request comprises a second set of respective values populating a second subset of the aggregated set of tracking parameters as indicated by the tracking URL.

8. The one or more media of claim 1, wherein sending tracking information to both the first tracking service and the second tracking service comprises:
based on a base URL included in the tracking URL, directing a first request to the first tracking service, wherein the first request comprises a first set of respective values populating a first subset of the aggregated set of tracking parameters as indicated by the tracking URL;
making a second request to an API of the second tracking service, wherein the second request comprises a second set of respective values populating a second subset of the aggregated set of tracking parameters as indicated by the tracking URL.

9. The one or more non-transitory machine-readable media of claim 1, wherein the tracking URL comprises the aggregated set of tracking parameters appended to a base URL as respective name-value pairs.

10. The one or more non-transitory machine-readable media of claim 1, wherein aggregating together the individual sets of tracking parameters, returning the tracking URL, generating the post associated with the campaign, and sending the tracking information to both the first tracking service and the second tracking service are performed by a social relationship management (SRM) application configured to manage social media content on a plurality of social media platforms.

11. The one or more non-transitory machine-readable media of claim 1, wherein sending the tracking information to the second tracking service is performed by the first tracking service.

12. The one or more non-transitory computer-readable media of claim 1, further storing instructions which, when executed by the one or more processors, cause:
redirecting a user agent that supplied the user input to a web page associated with the tracking URL, without redirecting the user agent to at least the second tracking service.

13. The one or more non-transitory computer-readable media of claim 1, wherein sending tracking information to both the first tracking service and the second tracking service comprises:
obtaining the first set of tracking parameters from the aggregated set of tracking parameters;
arranging the first set of tracking parameters in the first parameter format defined by the first tracking service;
sending the first set of tracking parameters, arranged in the first parameter format, to a first interface associated with the first tracking service;
obtaining the second set of tracking parameters from the aggregated set of tracking parameters;
arranging the second set of tracking parameters in the second parameter format defined by the second tracking service;
sending the second set of tracking parameters, arranged in the second parameter format, to a second interface associated with the second tracking service.

14. One or more non-transitory machine-readable media storing instructions which, when executed by one or more processors, cause:
receiving user input indicating a selection of a link presented in a post published on a social media platform, where in the selection of the link is made by a consumer of the social media platform;
mapping the link to a tracking URL,
wherein the tracking URL comprises:
(a) a first set of tracking parameters specified by a first tracking URL template and configured to pass tracking information to a first tracking service in a plurality of tracking services, and
(b) a second set of tracking parameters specified by a second tracking URL template and configured to pass tracking information to a second tracking service in the plurality of tracking services,
wherein the first tracking URL template indicates a first parameter format, defined by the first tracking service, for the first set of tracking parameters;
wherein the second tracking URL template indicates a second parameter format, defined by the second tracking service, for the second set of tracking parameters;
the first parameter format being different from the second parameter format;
the first set of tracking parameters comprising at least one tracking parameter that is not in the second set of tracking parameters;
determining tracking data associated with the tracking URL;
wherein the tracking data comprises a first set of tracking information passed to the tracking services based on a first set of prior selections, by a plurality of consumers, of one or more links mapped to the tracking URL;
determining digital body language corresponding to historical online behavior associated with the consumer;
wherein the digital body language comprises a second set of tracking information passed to the tracking services based on a second set of prior selections, by the consumer, of a plurality of URLs;
sending one or more of the first set of tracking information or the second set of tracking information to both (a) the first tracking service using the first set of tracking parameters in the first parameter format defined by the first tracking service and (b) the second tracking service using the second set of tracking parameters in the second parameter format defined by the second tracking service;
identifying a candidate set of destination URLs associated with the tracking URL;
based on the tracking data and the digital body language: selecting a particular destination URL, from the candidate set of destination URLs, towards which to redirect the consumer;
based on the particular destination URL: causing a destination page associated with the particular destination URL to be presented to the consumer.

15. The one or more media of claim 14, wherein the tracking data comprises one or more of:
- a number of presentations of posts including the link mapped to the tracking URL;
- a number of selections of the link mapped to the tracking URL;
- channels through which the selections of the link were made;
- a number of purchase orders resulting from the selections of the link; or
- a number of times a particular destination page was presented in response to the selections of the link.

16. The one or more media of claim 14, wherein the digital body language comprises one or more of:
- the consumer's interaction history with a particular campaign;
- the consumer's browsing history;
- the consumer's purchasing history;
- a browser type of a browser used by the consumer to interact with the post;
- a channel on which the consumer interacted with the post; or
- a destination page previously presented to the consumer in response to selections, by the consumer, of one or more links mapped to the tracking URL.

17. The one or more media of claim 14, further storing instructions which, when executed by the one or more processors, cause:
- determining that the user input is associated with a particular cookie;
- identifying a digital body language profile associated with the particular cookie, wherein the digital body language profile comprises the digital body language associated with the consumer.

18. The one or more media of claim 14, wherein selections of the link by different consumers result in selection of different destination URLs from the candidate set of destination URLs.

19. The one or more media of claim 14, wherein selections of the link at different times result in selection of different destination URLs from the candidate set of destination URLs.

20. A method, comprising:
- receiving user input indicating a selection of a link presented in a post published on a social media platform, where in the selection of the link is made by a consumer of the social media platform;
- mapping the link to a tracking URL, wherein the tracking URL comprises:
  - (a) a first set of tracking parameters specified by a first tracking URL template and configured to pass tracking information to a first tracking service in a plurality of tracking services, and
  - (b) a second set of tracking parameters specified by a second tracking URL template and configured to pass tracking information to a second tracking service in the plurality of tracking services,
  - wherein the first tracking URL template indicates a first parameter format, defined by the first tracking service, for the first set of tracking parameters;
  - wherein the second tracking URL template indicates a second parameter format, defined by the second tracking service, for the second set of tracking parameters;
  - the first parameter format being different from the second parameter format;
  - the first set of tracking parameters comprising at least one tracking parameter that is not in the second set of tracking parameters;
- determining tracking data associated with the tracking URL;
- wherein the tracking data comprises a first set of tracking information passed to the tracking services based on a first set of prior selections, by a plurality of consumers, of one or more links mapped to the tracking URL;
- determining digital body language corresponding to historical online behavior associated with the consumer;
- wherein the digital body language comprises a second set of tracking information passed to the tracking services based on a second set of prior selections, by the consumer, of a plurality of URLs;
- sending one or more of the first set of tracking information or the second set of tracking information to both (a) the first tracking service using the first set of tracking parameters in the first parameter format defined by the first tracking service and (b) the second tracking service using the second set of tracking parameters in the second parameter format defined by the second tracking service;
- identifying a candidate set of destination URLs associated with the tracking URL;
- based on the tracking data and the digital body language: selecting a particular destination URL, from the candidate set of destination URLs, towards which to redirect the consumer;
- based on the particular destination URL: causing a destination page associated with the particular destination URL to be presented to the consumer;
- wherein the method is performed by one or more devices respectively including one or more hardware processors.

* * * * *